US008548011B2

(12) United States Patent
Green

(10) Patent No.: US 8,548,011 B2
(45) Date of Patent: Oct. 1, 2013

(54) DYNAMIC HOST CLOCK COMPENSATION

(75) Inventor: Andrew Gordon Green, Didcot (GB)

(73) Assignee: PLX Technology, Inc., Sunnyvale, CA (US)

( * ) Notice: Subject to any disclaimer, the term of this patent is extended or adjusted under 35 U.S.C. 154(b) by 390 days.

(21) Appl. No.: 12/959,239

(22) Filed: Dec. 2, 2010

(65) Prior Publication Data

US 2012/0140781 A1    Jun. 7, 2012

(51) Int. Cl.
*H04J 3/07*     (2006.01)

(52) U.S. Cl.
USPC .......................................................... 370/506

(58) Field of Classification Search
USPC ................... 370/229–235, 503–520
See application file for complete search history.

(56) References Cited

U.S. PATENT DOCUMENTS

| 6,208,666 | B1 * | 3/2001 | Lawrence et al. ............. 370/503 |
| 6,243,369 | B1 * | 6/2001 | Grimwood et al. ........... 370/335 |
| 6,546,025 | B1 * | 4/2003 | Dupuy .......................... 370/509 |
| 7,035,292 | B1 * | 4/2006 | Giorgetta et al. ............. 370/509 |
| 7,061,866 | B2 * | 6/2006 | Connor ......................... 370/235 |
| 7,652,598 | B2 * | 1/2010 | Hazzard et al. ............... 341/100 |
| 7,660,333 | B2 * | 2/2010 | DeLew et al. ................. 370/516 |
| 7,796,509 | B2 * | 9/2010 | Gonzalez et al. ............. 370/229 |
| 7,961,606 | B2 * | 6/2011 | Cunningham ................ 370/229 |
| 8,117,332 | B2 * | 2/2012 | Riggert et al. ................ 709/231 |
| 2002/0159552 | A1 * | 10/2002 | Shin et al. ..................... 375/354 |
| 2002/0172200 | A1 * | 11/2002 | Shin et al. ..................... 370/389 |
| 2008/0089363 | A1 * | 4/2008 | Paulitsch et al. ............. 370/503 |
| 2009/0279572 | A1 * | 11/2009 | Takada et al. ................ 370/503 |

* cited by examiner

*Primary Examiner* — Kwang B Yao
*Assistant Examiner* — Juvena Loo
(74) *Attorney, Agent, or Firm* — Beyer Law Group LLP

(57) ABSTRACT

In accordance with a first embodiment of the present invention, a method for improving synchronization of communications between a first port and a second port is provided, the method performed at the first port and comprising: inserting skip symbols into a transmission stream for transmissions from the first port to the second port, wherein the skip symbols are inserted at a first average frequency level; detecting a lack of synchronization between the first port and the second port; and inserting skip symbols into the transmission stream at a second average frequency level greater than the first average frequency level in response to the detecting.

20 Claims, 5 Drawing Sheets

DYNAMIC HOST CLOCK COMPENSATION

BACKGROUND OF THE INVENTION

1. Field of the Invention

The present invention relates generally to electronic communication. More specifically, the present invention relates to the dynamic compensation of host clocks.

2. Description of the Related Art

Universal Serial Bus (USB) protocol is a standard communications protocol for sending signals between devices and host controllers. USB has become the standard mechanism to communicate between computer devices, and is commonly used to link peripherals, such as keyboards, mice, external disk drives, etc. with personal computers. It is also quite commonly used to link various self-sufficient devices, such as cellular phones, portable media devices, etc. with personal computers.

USB 3.0, also known as SuperSpeed USB, is the latest iteration of the USB standard. It incorporates a "SuperSpeed" bus to achieve communication speeds of up to 5.0 Gb/s. Each side of a USB 3.0 link has a reference clock that is used to synchronize the communications over the link. The USB 3.0 architecture supports a separate reference clock source on each side of the link, but the accuracy of each clock is required to be within +/−300 ppm. In addition, all ports are required to have Spread Spectrum Clock (SSC) modulation. The maximum spread is +0/−5000 ppm. This gives a maximum possible frequency difference between the two devices of a link of +300 to −5300 ppm.

Even when the clocks on both side of the link are within these required tolerances, there is still a need to compensate for the frequency differences, lest the two clocks eventually get too far out of sync. The USB 3.0 spec provides for skip (SKP) symbols to be inserted in the data stream to compensate for these frequency differences. A SKP symbol is essentially a blank symbol used only to pad the data rate to allow the receiver to have additional symbols that can be dropped in order to compensate for differences in frequencies. Thus, if it turns out the host clock is faster than the peripheral device's clock, then the peripheral device can ignore a certain number of SKP symbols to compensate.

The USB 3.0 standard provides that the transmitter send out an average of one SKP ordered set every 354 symbols. Since the once every 354 symbols is only an average, the transmitter has the flexibility to wait to insert a SKP ordered set until a packet (of varying length) has completed, so as not to insert the symbols in the middle of a packet. An eight symbol (four ordered set) buffer is kept on the transmission side to hold the SKP symbols until the current packet has completed.

This solution works well for host/device combinations whose clock variance is within the tolerances provided by the USB 3.0 standard. However, the inventors of the present invention discovered that it is quite common for USB 3.0 hosts to fall outside of the standard specification, either due to design error or poor configurations. While operating USB 3.0 hosts or devices outside of the accepted standard is not an ideal situation, it is difficult if not impossible to control all the different hosts or devices sold by all the different integrated circuit manufacturers in the industry.

What is needed is a solution that allows for non-compliant USB 3.0 hosts or devices to operate properly when reference clocks on either end of the link fall outside of prescribed tolerance levels.

SUMMARY OF THE INVENTION

In accordance with a first embodiment of the present invention, a method for improving synchronization of communications between a first port and a second port is provided, the method performed at the first port and comprising: inserting skip symbols into a transmission stream for transmissions from the first port to the second port, wherein the skip symbols are inserted at a first average frequency level; detecting a lack of synchronization between the first port and the second port; and inserting skip symbols into the transmission stream at a second average frequency level greater than the first average frequency level in response to the detecting.

In accordance with a second embodiment of the present invention, an apparatus is provided comprising: a transmission buffer configured to receive transmission packets; a multiplexer coupled to the transmission buffer and configured to: insert skip symbols into a transmission stream for transmissions, wherein the skip symbols are inserted at a first average frequency level; detect a lack of synchronization the apparatus and a receiver; and insert skip symbols into the transmission stream at a second average frequency level greater than the first average frequency level in response to the detecting; and a transmitter coupled to the multiplexer and configured to transmit the transmission stream to the receiver.

In accordance with a third embodiment of the present invention, a first port for improving synchronization of communications between the first port and a second port, the first port comprising: means for inserting skip symbols into a transmission stream for transmissions from the first port to the second port, wherein the skip symbols are inserted at a first average frequency level; means for detecting a lack of synchronization between the first port and the second port; and means for inserting skip symbols into the transmission stream at a second average frequency level greater than the first average frequency level in response to the detecting.

DETAILED DESCRIPTION OF SPECIFIC EMBODIMENTS

Figure 1:
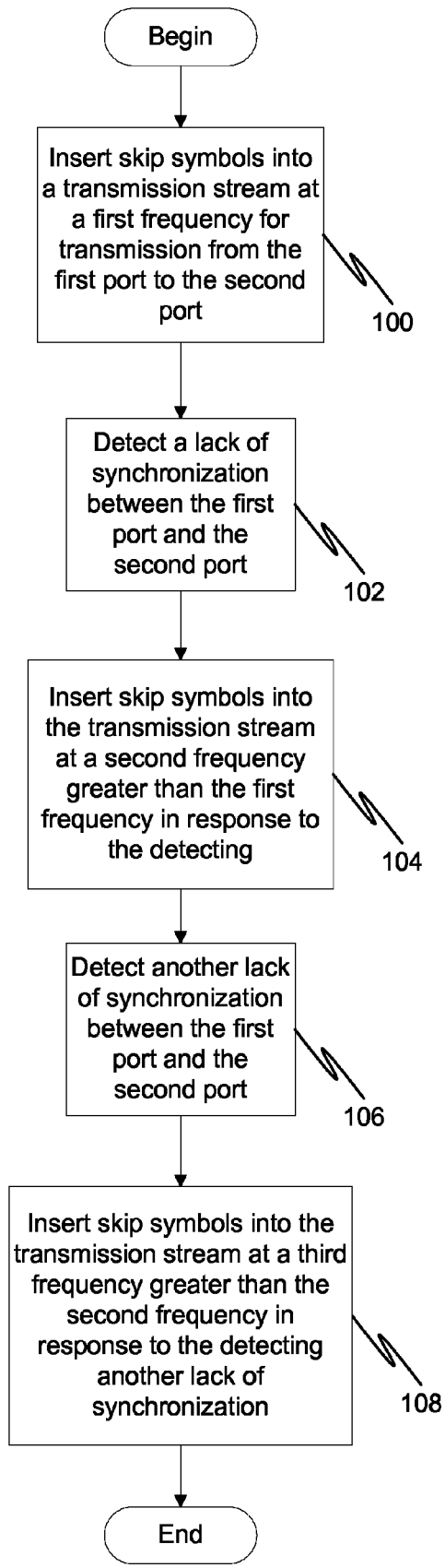
FIG. 1 is a flow diagram illustrating a method for improving synchronization of communications between a first port and a second port in accordance with an embodiment of the present invention.

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details.

In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention provides a mechanism to increase SKP symbol frequency if it appears that the receiving port is falling out of synchronization with the transmitting port. These additional symbols allow the receiving port more flexibility in dropping packets to compensate for the variance in clock rates. Using the present invention, it is possible for hosts devices that are not USB 3.0 compliant (due to the variances of their clock frequencies being greater than standard tolerances) to still be used to send or receive USB 3.0 communications.

The SKP frequency itself can also be adjusted in a number of different ways. In one embodiment of the present invention, the frequency may be slowly adjusted upwards. For example, if 3 host recoveries are detected, the frequency may be adjusted upwards 12.5%. This would be for an implementation having a frequency granularity of 8 (8 different selectable frequency adjustment levels). Then monitoring of the system can continue to determine whether or not this new frequency is working. If it is not (for example, if additional host recoveries are detected), the frequency may be adjusted upwards another 12.5%. This process may repeat until no more host recoveries are detected (or, at least, under a threshold). There may also be an upper limit on the amount the frequency can be adjusted. For example, in one embodiment, the frequency cannot be raised more than double the nominal frequency.

Thus, the present invention provides a solution that permits non-compliant or partially compliant USB 3.0 hosts or device to still operate within a USB 3.0 system. This solution also has the advantage of not requiring significant complexity to implement on a USB 3.0 host or device, saving processing power and time.

The following is a pseudocode example of one possible embodiment of the present invention:

```
if ( USB3_READ_REG(USB3_CORE_LINK_RECOVERY_TRIGGERS) & (FAR_END | UNKNOWN) )
{
    // the host has issued a recovery. We could make its life a bit easier by sending more
    // SKPs.
    // Just make sure it's not a freak occurrence (wait for 3 of them), then increase our
    // skip frequency.
    ++xUSB3->hostRecoveryCount;
    if (xUSB3->hostRecoveryCount > 3)
    {
        register unsigned tmp;
        #define USB3_CORE_LINK_SKIPCOUNT_BADHOST_LIMIT   (354/2) // double rate
        tmp = USB3_READ_REG(USB3_CORE_LINK_SKIPCOUNT);
        if (USB3_CORE_LINK_SKIPCOUNT_DEFAULT > USB3_CORE_LINK_SKIPCOUNT_BADHOST_LIMIT)
        {
            tmp -= 8;
        }
        USB3_WRITE_REG(USB3_CORE_LINK_SKIPCOUNT, tmp);
        xUSB3->hostRecoveryCount = 0;
    }
    // reset the latches so we catch a subsequent event
    USB3_CLEAR_BITS( USB3_CORE_LINK_RECOVERY_TRIGGERS, (FAR_END | UNKNOWN) );
}
```

It should be noted that the present invention can actually be implemented on any host or device, whether USB 3.0 compliant or not. This allows apparently conforming hosts or devices to retain USB 3.0 links even when accidentally falling out of compliance.

In one embodiment of the present invention, the transmitting device monitors host-initiated recoveries, and increases the SKP frequency if more than a set number of host-initiated recoveries are detected. For example, in one embodiment, if more than 3 host-initiated recoveries are detected, the SKP frequency can be adjusted. It should be noted that the number of host-initiated recoveries that triggers the adjustment of SKP frequency can vary depending upon implementation, and nothing in this disclosure shall be interpreted as limiting the scope of the invention to any particular number.

There are a number of different alternative embodiments of the present invention that will be described. Firstly, the mechanism that the system undertakes to monitor whether a loss of connection between two ports has occurred can be varied. While simply counting the number of recoveries initiated by the port at the opposite end of a connection is a simple and efficient mechanism to monitor loss of connection, there may be other, more reliable ways of detecting a clock mismatch. Indeed, an opposite port-initiated recovery can be generated for a number of different reasons that may not involve clock mismatches, such as, for example, problems with the physical link between the ports (disconnection, bad wire, etc.). While the threshold described above may be set so as to eliminate some of these non-clock related recoveries, there may be instances where it is beneficial to more accurately detect clock mismatch issues. In one embodiment of the present invention, other possible causes are examined prior to assuming that a host-initiated recovery equals a clock mismatch issue and if it is determined that the recovery was due to a different issue, the recovery will not "count" as a clock mismatch issue for purposes of adjusting the SKP packet frequencies. In another embodiment, the transmitted packets themselves can be examined to determine the reason for the recovery. For example, it may be possible that the opposite port may send a message explicitly stating why a recovery is needed.

The USB 3.0 standard provides a number of different reasons why link recovery may be initiated by a host or device that aren't typically tied to a failing in synchronization. These include, for example, a receiver header sequence number error, an acknowledgement transmission header sequence number error, a header sequence number advertisement error, a receiver header buffer credit advertisement error. If it can be determined that the link recovery was initiated for any of these reasons, for example, then the link recovery can safely be ignored (at least as it applied to the process of the present invention).

FIG. 1 is a flow diagram illustrating a method for improving synchronization of communications between a first port and a second port in accordance with an embodiment of the present invention. This method may be performed at the first port (transmitter). At 100, skip symbols are inserted into a transmission stream for transmission from the first port to the second port. These skip symbols are inserted at a first average frequency. The skip symbols may be part of a skip ordered set. At 102, a lack of synchronization is detected between the first port and the second port. As described above, this detecting may be accomplished in a number of different ways. In one embodiment, the detecting includes detecting a number of recovery requests generated by the second port that exceeds a predefined threshold. In another embodiment, the detecting includes detecting a number of recovery requests generated by the second port that exceeds a predefined threshold for a particular period of time. This detecting may also include monitoring packets transmitted in the transmission stream to determine if alternative reasons other than lack of synchronization are responsible for one or more of the link recovery requests. At 104, skip symbols are inserted into the transmission stream at a second average frequency greater than the first average frequency level in response to the detecting. At 106, another lack of synchronization between the first port and the second port is detected. At 108, skip symbols are inserted into the transmission stream at a third average frequency level greater than the second average frequency level in response to the detecting of another lack of synchronization.

Figure 2:
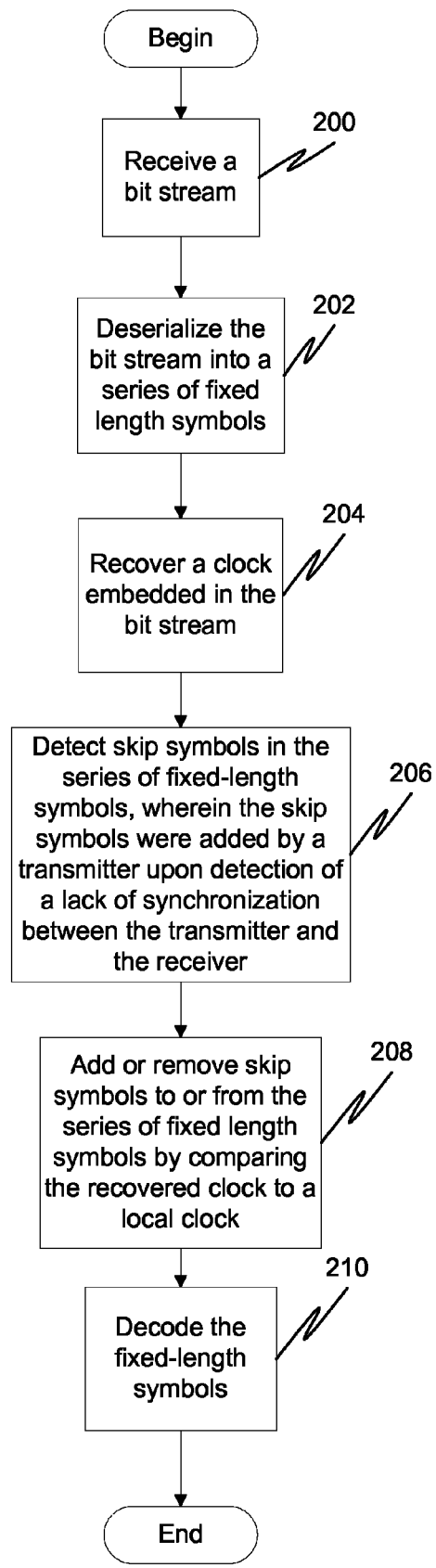
FIG. 2 is a flow diagram illustrating a method for improving synchronization of communications between a first port and a second port.

FIG. 2 is a flow diagram illustrating a method for improving synchronization of communications between a first port and a second port. This method may be performed at the second port (receiver). At 200, a bit stream is received. At 202, the bit stream is deserialized into a series of fixed length symbols. At 204, a clock embedded in the bit stream is recovered. At 206, skip symbols are detected in the series of fixed-length symbols, wherein the skip symbols were added by the first port (transmitter) upon detection of a lack of synchronization between the first port and the second port, but the receiver operates in the same way as the original specification. At 208, skip symbols are added to or removed from the series of fixed-length symbols by comparing the recovered clock to a local clock. At 210, the fixed-length symbols may be decoded.

While the invention has been described so far in the context of USB 3.0, one of ordinary skill in the art will recognize that the invention could also be applied to other transmission standards. For example, the Peripheral Component Interconnect Express (PCIe) standard provides for an elastic buffer to compensate for any frequency difference between a receive clock and a transmission clock, as long as the appropriate SKP symbols are inserted at the transmission side.

Figure 3:
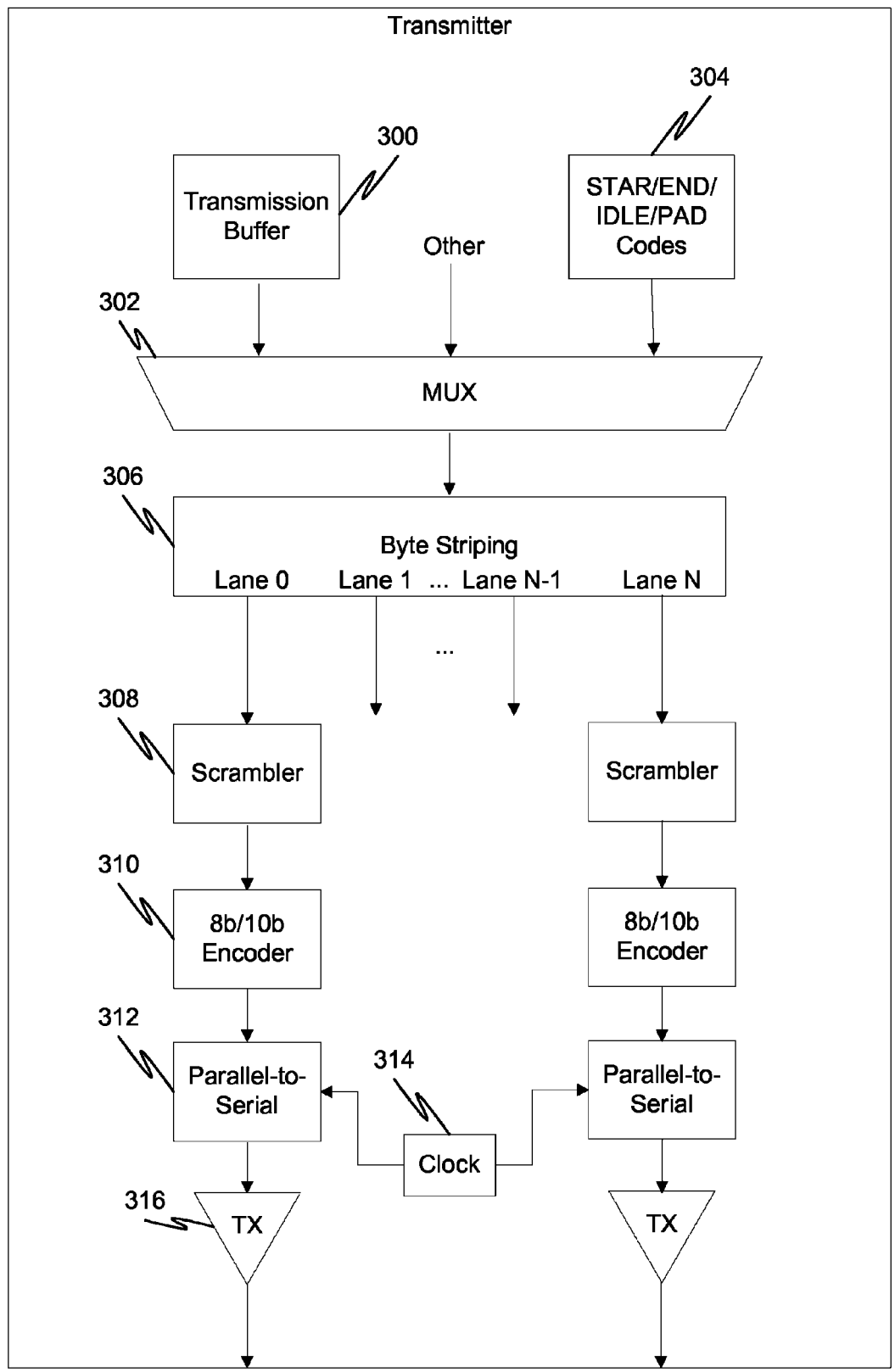
FIG. 3 is a block diagram illustrating a physical layer transmit circuit in accordance with an embodiment of the present invention.
Figure 4:
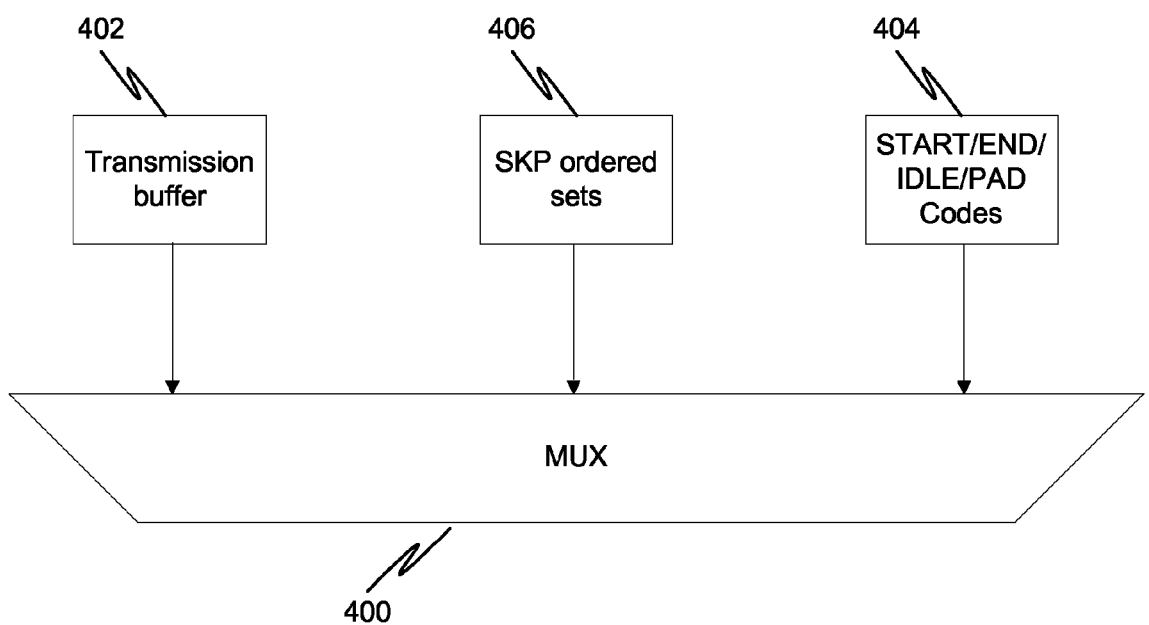
FIG. 4 is a block diagram illustrating a magnified view of the multiplexer of FIG. 3.
Figure 5:
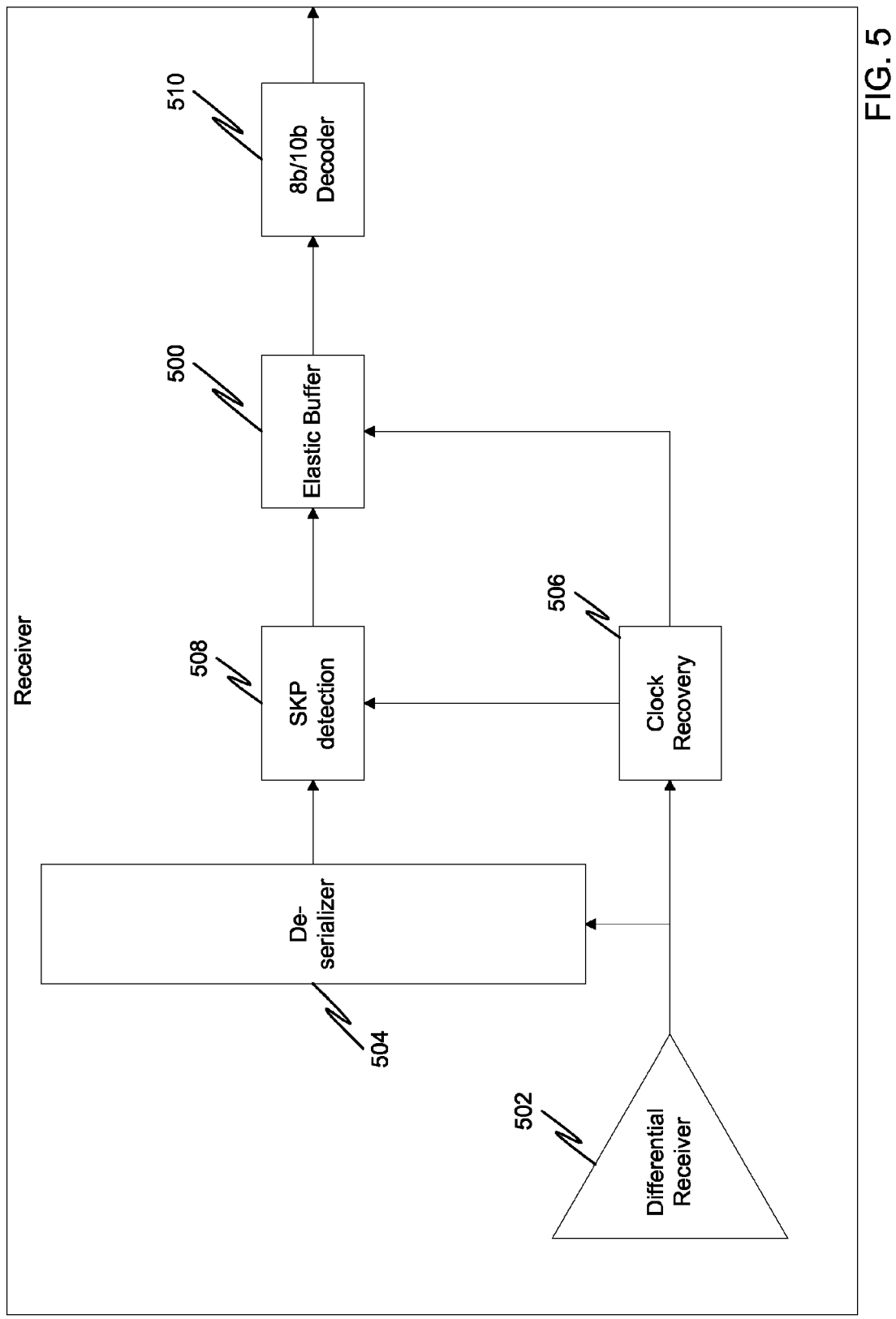
FIG. 5 is a block diagram illustrating an apparatus for receiving communications.

The architecture for a PCIe embodiment is described in FIGS. 3-5, although similar architecture could be used for a USB 3.0 (or other) embodiment as well. FIG. 3 is a block diagram illustrating a physical layer transmit circuit in accordance with an embodiment of the present invention. Here, a transmission buffer 300 receives and temporarily stores transmission packets. A multiplexer 302 multiplexes these transmission packets with start/end/idle/pad codes 304. Byte striping 306 then occurs to break the multiplexed packets into multiple lanes. It should be noted that in the USB 3.0 embodiment, only a single lane may be used.

For each lane, a scrambler 308 scrambles the packets and an 8b/10b encoder 310 encodes them. A parallel to serial converter 312 converts the packets to a serial stream, using a transmission clock 314. Finally, transmitter 316 transmits the serialized stream.

FIG. 4 is a block diagram illustrating a magnified view of multiplexer 302 of FIG. 3. Here, multiplexer 400 multiplexes not only transmission packets from transmission buffer 402 and start/end/idle pad codes 404, but also SKP ordered sets 406. These SKP ordered sets may be inserted into the packet stream in accordance with the process described above to determine when and how many SKP ordered sets to insert. IN PCIe, a SKP Ordered set consists of four control symbols (a COM and three SKPs). In USB 3.0, a SKP Ordered set consists of just two control symbols (two SKP K28.1).

On the receive side, FIG. 5 is a block diagram illustrating an apparatus for receiving communications in accordance with an embodiment of the present invention. Here, elastic buffer 500 is incorporated into the very early stages of the receive path. Symbols arrive at the differential receiver 502 as a bit stream and are presented to a deserializer 504. A receive PLL 506 recovers the clock embedded in the bit stream and the deserializer 504 converts the incoming bit stream into a series of 10-bit symbols. These symbols can then be clocked into the input side of the elastic buffer 500 using the receiver's local clock.

The elastic buffer 500 can then compensate for the clock difference by using a SKP symbol detector 508 to detect SKP symbols and either deleting a SKP symbol from or inserting an additional SKP symbol into the symbols contained in the elastic buffer. The transmitter on the other side of the link periodically transmits a SKP Ordered Set from which the "don't care" SKP symbol can be deleted or to which a "don't care" SKP symbol can be added. Thus, deleting or adding a SKP symbol from or to the SKP Ordered Set in the elastic buffer 500 prevents a buffer overflow or underflow condition, respectively. An 8b/10b decoder 510 can then decode the fixed-length symbols.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for improving synchronization of communications between a first port and a second port, the method performed at the first port and comprising:
   inserting skip symbols into a transmission stream for transmissions from the first port to the second port, wherein the skip symbols are inserted at a first average frequency level;
   detecting a lack of synchronization between the first port and the second port associated with a clock rate variance being greater than a standard tolerance accommodated by the first average frequency level; and
   inserting skip symbols into the transmission stream at a second average frequency level greater than the first average frequency level in response to the detecting;
   wherein an average skip symbol frequency is increased from the first average frequency level to the second average frequency level when the clock rate variance between the first port and the second port is greater than the standard tolerance.

2. The method of claim 1, wherein the detecting includes detecting a number of recovery requests generated by the second port, the number of link recovery requests exceeding a predefined threshold.

3. The method of claim 1, wherein the detecting includes detecting a number of recovery requests generated by the second port, the number of link recovery requests exceeding a predefined threshold in a particular period of time.

4. The method of claim 1, further comprising:
   detecting another lack of synchronization between the first port and the second port;
   inserting skip symbols into the transmission stream at a third average frequency level greater than the second average frequency level in response to the detecting another lack of synchronization.

5. A method for improving synchronization of communications between a first port and a second port, the method performed at the first port and comprising:
   inserting skip symbols into a transmission stream for transmissions from the first port to the second port, wherein the skip symbols are inserted at a first average frequency level compliant with the USB 3.0 specification;
   detecting a lack of synchronization between the first port and the second port resulting from a variance in clock rates being greater than a standard tolerance accommodated by the first average frequency level; and
   inserting skip symbols into the transmission stream at a second average frequency level greater than the first average frequency level in response to the detecting;
   wherein the transmission stream is a USB 3.0 transmission stream and an average skip symbol frequency is increased from the first average frequency level to the second average frequency level to compensate for reference clocks being non-compliant with the USB 3.0 specification on either end of the link between the first port and the second port.

6. A method for improving synchronization of communications between a first port and a second port, the method performed at the first port and comprising:
   inserting skip symbols into a transmission stream for transmissions from the first port to the second port, wherein the skip symbols are inserted at a first average frequency level compliant with the PCIe specification;
   detecting a lack of synchronization between the first port and the second port; and
   inserting skip symbols into the transmission stream at a second average frequency level greater than the first average frequency level in response to the detecting;
   wherein the transmission stream is a PCIe transmission stream and an average skip symbol frequency is increased from the first average frequency level to the second average frequency level to compensate for reference clocks being non-compliant with the PCIe specification on either end of the link between the first port and the second port.

7. The method of claim 2, further comprising monitoring packets transmitted in the transmission stream to determine if alternative reasons than lack of synchronization are responsible for one or more of the link recovery requests.

8. The method of claim 1, wherein the skip symbols are part of a skip ordered set.

9. An apparatus comprising:
   a transmission buffer configured to receive transmission packets;
   a multiplexer coupled to the transmission buffer and configured to:
   insert skip symbols into a transmission stream for transmissions, wherein the skip symbols are inserted at a first average frequency level;
   detect a lack of synchronization between the apparatus and a receiver resulting from a variance in clock rates being greater than a standard tolerance accommodated by the first average frequency level; and
   insert skip symbols into the transmission stream at a second average frequency level greater than the first average frequency level in response to the detecting; and
   a transmitter coupled to the multiplexer and configured to transmit the transmission stream to the receiver;
   wherein an average skip symbol frequency is increased from the first average frequency level to the second average frequency level when the variance in clock rates between the first port and the second port is greater than the standard tolerance.

10. The apparatus of claim 9, further comprising an 8b/10b encoder coupled to the multiplexer and to the transmitter and configured to encode the transmission stream prior to it being transmitted.

11. The apparatus of claim 9, further comprising a parallel-to-serial converter coupled to the multiplexer and to the transmitter and configured to convert the transmission stream from parallel to serial form prior to it being transmitted.

12. The apparatus of claim 9, further comprising a byte striper coupled to the multiplexer configured to stripe the transmission stream into multiple lanes.

13. A first port for improving synchronization of communications between the first port and a second port, the first port comprising:
  means for inserting skip symbols into a transmission stream for transmissions from the first port to the second port, wherein the skip symbols are inserted at a first average frequency level;
  means for detecting a lack of synchronization between the first port and the second port resulting from a variance in clock rates being greater than a standard tolerance accommodated by the first average frequency level; and
  means for inserting skip symbols into the transmission stream at a second average frequency level greater than the first average frequency level in response to the detecting;
    wherein an average skip symbol frequency is increased from the first average frequency level to the second average frequency level when the variance in clock rates between the first port and the second port is greater than the standard tolerance.

14. The first port of claim 13, wherein the detecting includes detecting a number of recovery requests generated by the second port, the number of link recovery requests exceeding a predefined threshold.

15. The first port of claim 13, wherein the means for detecting includes means for detecting a number of recovery requests generated by the second port, the number of link recovery requests exceeding a predefined threshold in a particular period of time.

16. The first port of claim 13, further comprising:
  means for detecting another lack of synchronization between the first port and the second port;
  means for inserting skip symbols into the transmission stream at a third average frequency level greater than the second average frequency level in response to the detecting another lack of synchronization.

17. The first port of claim 13, wherein the transmission stream is a USB 3.0 transmission stream.

18. The first port of claim 13, wherein the transmission stream is a PCIe transmission stream.

19. The first port of claim 14, further comprising means for monitoring packets transmitted in the transmission stream to determine if alternative reasons than lack of synchronization are responsible for one or more of the link recovery requests.

20. The first port of claim 13, wherein the skip symbols are part of a skip ordered set.

\* \* \* \* \*